March 24, 1964  A. W. BLANSHINE  3,125,902
METHOD OF MANUFACTURING KNIVES
Filed May 29, 1961  4 Sheets-Sheet 1
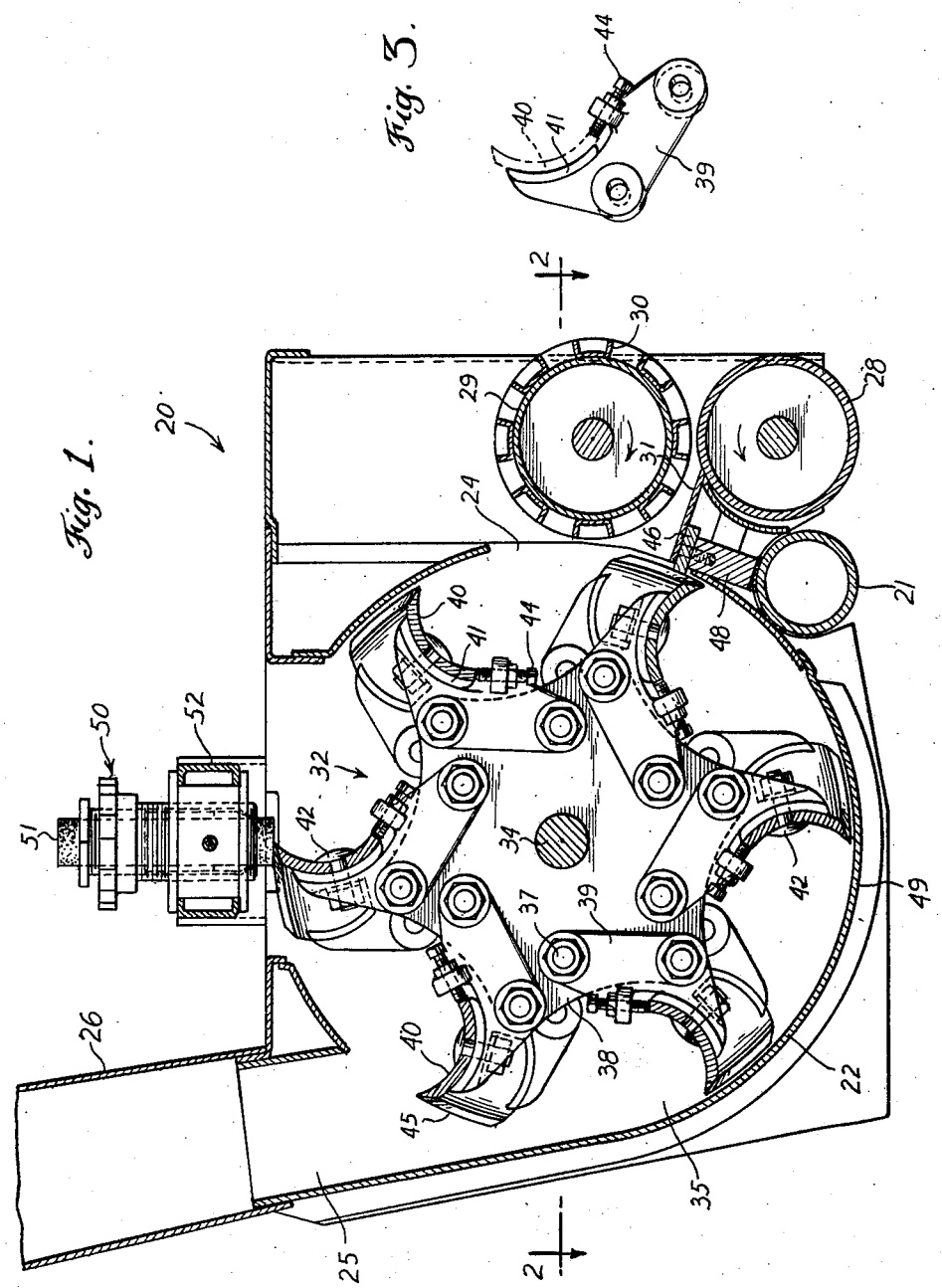
INVENTOR
ALLISON W. BLANSHINE
By Joseph A. Brown
ATTORNEY

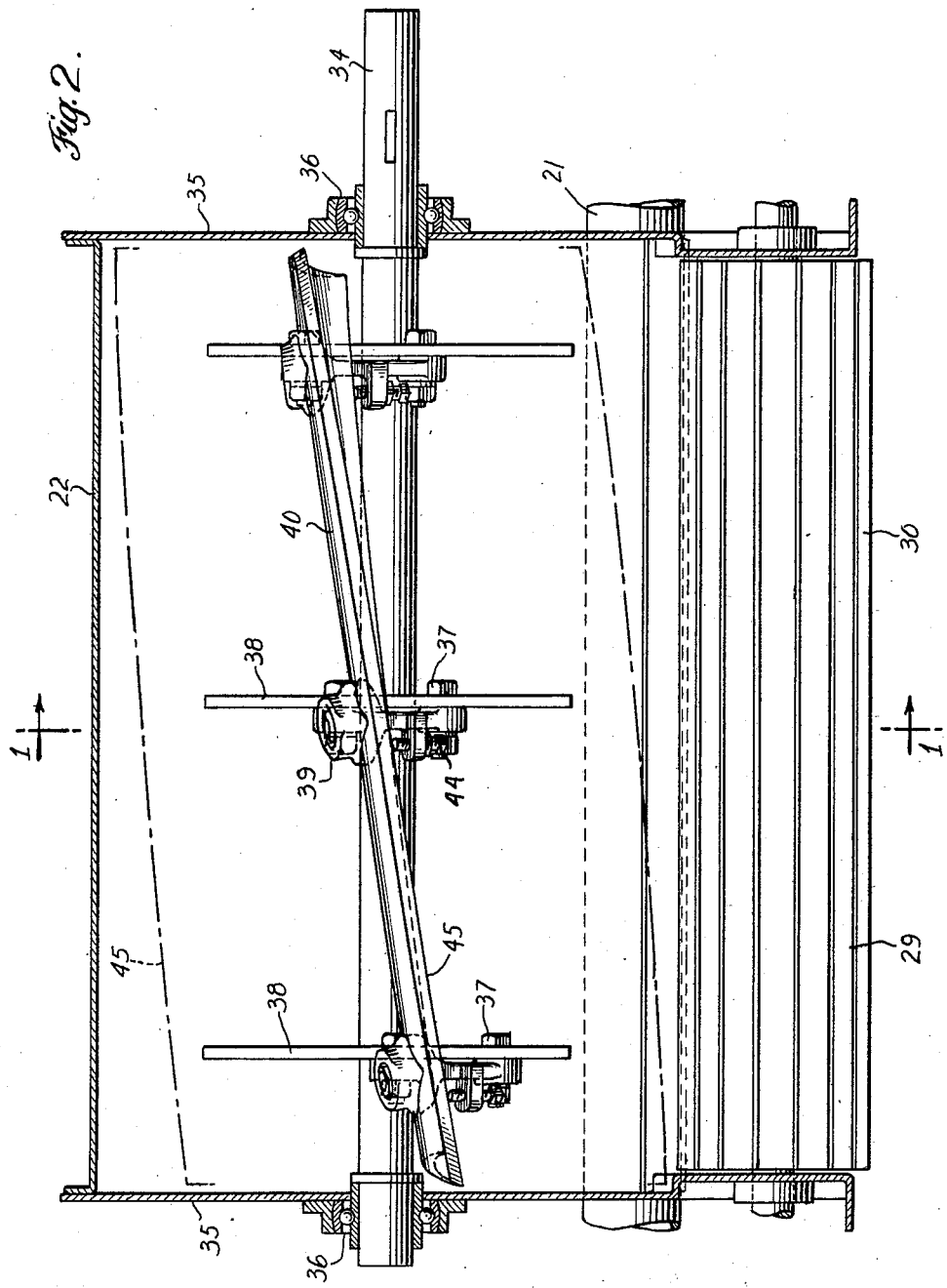

March 24, 1964 A. W. BLANSHINE 3,125,902
METHOD OF MANUFACTURING KNIVES
Filed May 29, 1961 4 Sheets-Sheet 3
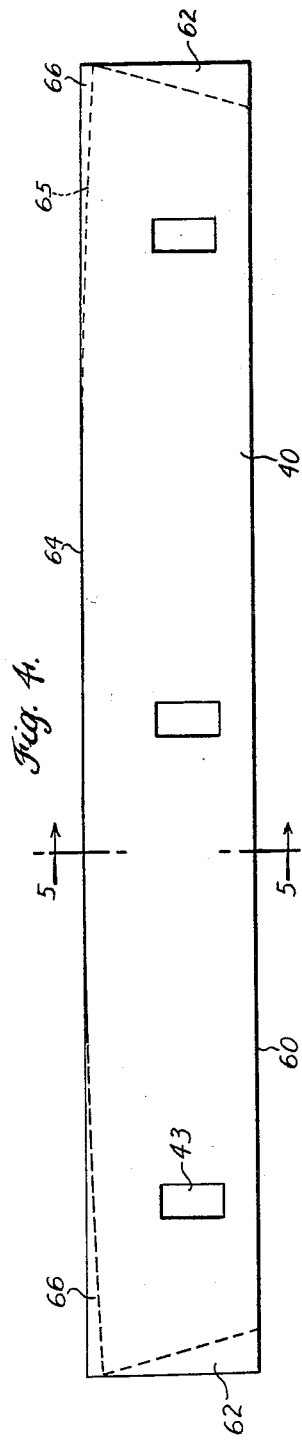
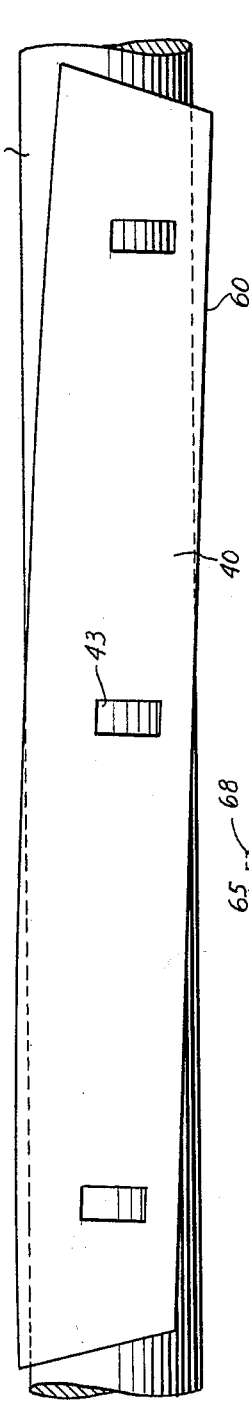
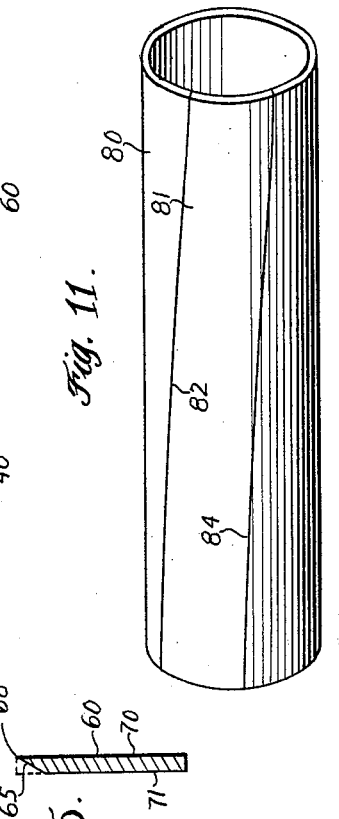
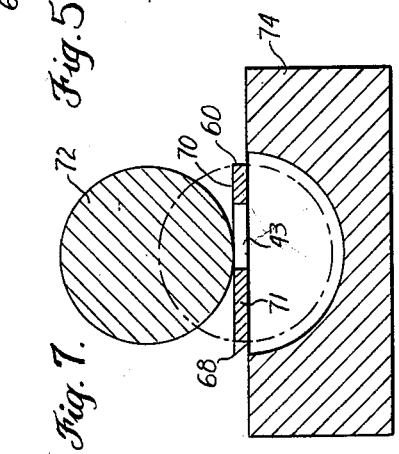
INVENTOR
ALLISON W. BLANSHINE
By Joseph C. Brown
ATTORNEY March 24, 1964  A. W. BLANSHINE  3,125,902
METHOD OF MANUFACTURING KNIVES
Filed May 29, 1961  4 Sheets-Sheet 4
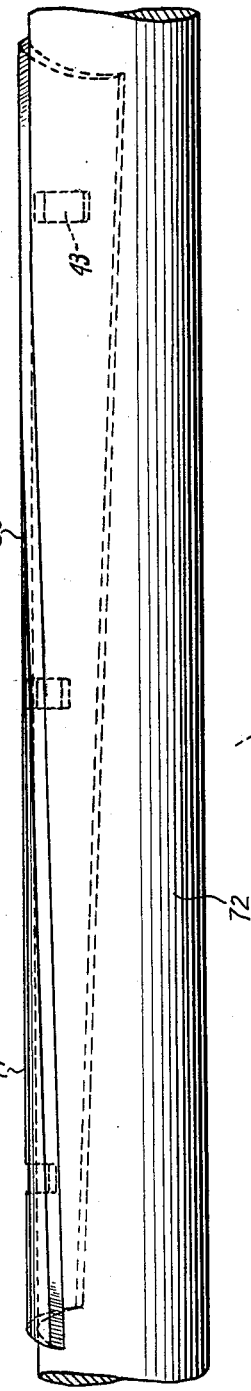
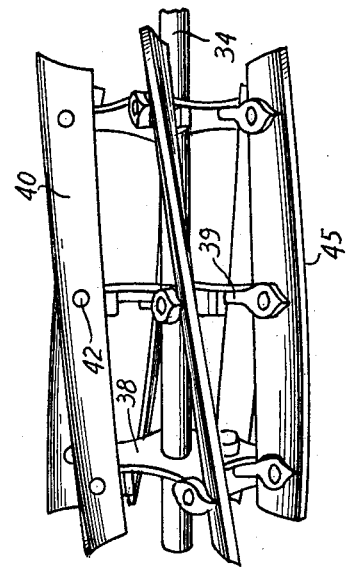
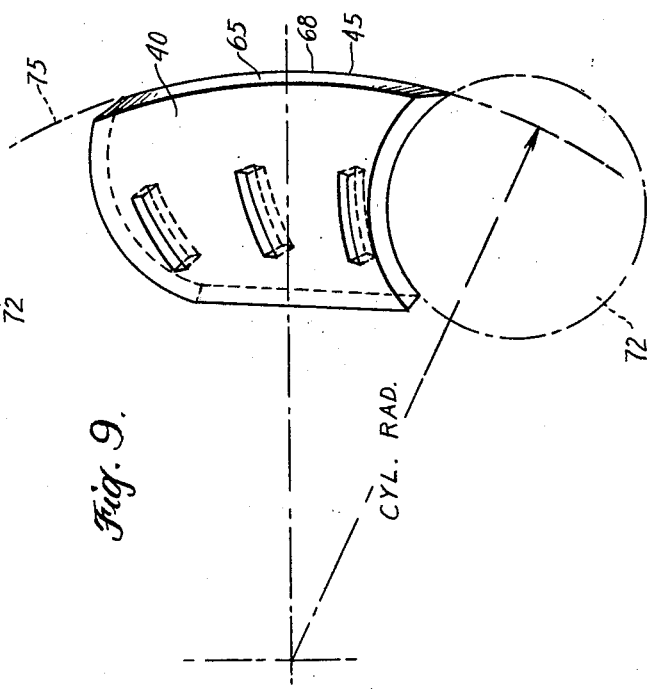
INVENTOR
ALLISON W. BLANSHINE
By Joseph A. Brown
ATTORNEY – # United States Patent Office 3,125,902
Patented Mar. 24, 1964

3,125,902
METHOD OF MANUFACTURING KNIVES
Allison W. Blanshine, Lititz, Pa., assignor to Sperry Rand Corporation, New Holland, Pa., a corporation of Delaware
Filed May 29, 1961, Ser. No. 113,376
1 Claim. (Cl. 76—104)

This invention relates to the manufacture of knives and more particularly to a method of making knives for the cutterhead of a forage harvester.

In forage harvesters having reel or rotary cutters of the type shown in U.S. Patent No. 2,735,469, the reel knives are angularly spaced relative to each other and they extend diagonally relative to the reel axis. Such diagonal extension is provided so that when each knife passes a stationary shear bar, a shearing rather than a chopping action is obtained. If the cutting edges of the knives are straight and diagonally extending they generate a hyperboloid on rotation of the reel rather than a true cylinder. Thus, the shear bar, with which the cutter knives successively operate, must be bowed toward the reel to provide a cutting edge contiguous to the hyperboloid generated. An alternative design which may be used, is to provide a shear bar which has a straight cutting edge and then to bow or twist the reel knives so that their cutting edges will generate a true cylinder and not a hyperboloid. Bowing or twisting the reel knives requires relatively elaborate compound spiral curved dies and involves expensive manufacturing procedures.

In forage harvesters, it is common that the reel knives serve a dual function. First, they cut the crop material being fed into the harvester and then they serve as fan elements to throw the material after it is cut through a discharge spout to a trailing wagon or the like. For a better throwing and blowing action, it is common to provide knives which are cup-shaped, the concave side of each knife facing in the direction of rotation of the reel.

Therefore, it is conventional in many harvesters to provide a plurality of knives on a cutter reel, each knife being cup-shaped and having a cutting edge which generates a true cylinder, such edge being provided by twisting and spiraling the knife.

A main object of this invention is to provide a simplified method of manufacturing knives for the cutterhead of a forage harvester of the character described, such method involving fewer steps and substantially less expense than methods used heretofore.

Another object of this invention is to provide forage harvester cutter knives which are adapted to be mounted diagonally relative to a cutterhead axis, each knife being formed and manufactured to provide a cutting edge which will generate a true cylinder when the cutterhead is rotated.

Another object of this invention is to provide a method of manufacturing knives which completely eliminates the necessity for elaborate compound spiral curved dies to produce the desired knife structure.

A further object of this invention is to provide a knife manufacturing method which produces a cup-shaped blade capable of being mounted diagonally relative to the axis of a cutter reel and having a cutting edge which will generate a true cylinder on rotation of the reel.

Other objects of this invention will be apparent hereinafter from the specification and from the recital in the appended claim.

In the drawings:

FIG. 1 is a fragmentary longitudinal vertical section taken on the line 1—1 of FIG. 2 looking in the direction of the arrows and showing the cutterhead of a forage harvester having knives mounted thereon constructed according to the method of this invention;

FIG. 2 is a section taken on the line 2—2 of FIG. 1 looking in the direction of the arrows, only one of the cutter knives being shown for clearness of illustration;

FIG. 3 is a prospective view of one of the knife mounting brackets and showing in phantom a knife mounted thereon;

FIG. 4 is a plan view of a workpiece from which the knife of this invention is constructed and showing in dotted lines the sections of the blank which are removed during the initial steps of the blade forming operation;

FIG. 5 is a section taken on the line 5—5 of FIG. 4 looking in the direction of the arrows, and showing the knife after a bevelled cutting edge has been formed thereon;

FIG. 6 shows the workpiece positioned adjacent a cylindrical forming bar and extending diagonally relative to the axis of the bar;

FIG. 7 is a view showing the workpiece, the cylindrical forming bar and the die member used in curving the workpiece;

FIG. 8 is a view showing the workpiece bent around the cylindrical forming bar;

FIG. 9 is a diagrammatic view showing one of the knives mounted on the harvester cutterhead and illustrating the operative relationship of the knife to the cylinder generated by the cutting edge of the knife;

FIG. 10 is a perspective view of a completed cutterhead having knives mounted thereon constructed according to the method of this invention; and FIG. 11 illustrates an alternative method for manufacturing knives according to this invention.

Referring now to the drawings by numerals of reference and first to FIGS. 1–3, 20 denotes generally a forage harvester base unit which comprises a frame 21 on which a blower housing 22 is mounted. Housing 22 is of generally cylindrical configuration when viewed from the side having a forward inlet opening 24 and a rearward discharge opening 25. Opening 25 communicates with a spout 26. Forage material is adapted to be fed into the housing 22 through inlet opening 24 by a pair of cooperative feed rolls, namely lower roll 28 and upper roll 29. The lower roll 28 is cylindrical and smooth while the upper roll 29 has transverse slats or ribs 30 which engage the crop material and exert an aggressive feeding action thereon. The crop material is fed between rolls 28 and 29 and delivered over support 31 toward inlet opening 24.

The material fed into the housing 22 is adapted to be chopped and then thrown and blown through discharge opening 25 and through the spout 26 to a trailing wagon or the like. For this purpose, a cutterhead 32 is provided comprising a support shaft 34 journaled in the side walls 35 of blower housing 22, FIG. 2, by suitable bearings 36. Affixed to shaft 34 and extending radially thereof are support discs 38 which are axially spaced relative to each other along shaft 34. As shown in FIG. 2, three discs are provided. However, a greater or lesser number could be used as desired. Each disc carries a plurality of knife supports 39 angularly spaced around the axis of the shaft 34; and the supports on one disc are angularly displaced relative to the supports on the other discs, see FIG. 2. As shown in FIG. 1, there are six knife supports 39 on each disc 38, each of the supports being constructed as shown best in FIG. 3. Each knife support is fastened by two bolts 37 to its associated disc. The knife supports carry knives 40, each knife being cooperatively carried on seats 41 of three axially spaced knife supports and fastened thereto by fastening bolts 42 which pass through rectangular openings 43 in each knife.

Each seat 41 comprises a segment of a true cylinder. Each knife has a curvature which is also a segment of a true cylinder and mates with the curvature of seats 41.

To compensate for wear and to adjust the knives radially outwardly relative to the axis of the cutter 32, the cutter-knife supports are provided with adjustment bolts 44 which engage the radial inner ends of the knives and are operable to index the knives outwardly. It will be understood, of course, that all of the knives are mounted in the same radial position so that their cutting edges 45 travel in the same path and successively cooperate with a shear bar 46 mounted along the lower portion of inlet opening 24. Shear bar 46 is mounted on a base 48, welded or otherwise affixed to the support frame 21.

As shown, each of the knives 40 is cup-shaped whereby after a given knife passes the shear bar 46, it sweeps the cut crop material along the bottom arcuate portion 49 of the blower housing 22 and then throws the material through discharge opening 25 and spout 26. To keep the knives sharp, a sharpening attachment 50 may be provided. The sharpening attachment includes a sharpening stone 51 which is reciprocable in a direction parallel to the axis of the shaft 34 and when in engagement with the cutting edges 45 exerts a sharpening action thereon. The attachment 50 is adapted to be reciprocated on a track 52 by a suitable means, not shown, with cutter 32 rotating. The stone 51 thus engages all of the knives mounted on the cutter and sharpens them. The details of the structure of the sharpener may be similar to that shown in U.S. Patent Number 2,788,623.

Each of the knives 40 is elongate and is mounted on cutterhead 32 with the longitudinal axis of the knife diagonal to the axis of cutter shaft 34. This can be seen best from FIG. 2. Preferably the angularity is about ten degrees. As each knife approaches the shear bar 46 one axial end of the knife will come into cooperative relation with the shear bar and thereafter the entire cutting edge will pass the bar. Thus, the crop material will be sheared rather than chopped.

The knives 40 on cutter 32 are curved or cup-shaped; they extend diagonally relative to the cutter axis; and they successively cooperate with shear bar 46 to produce a desired cutting action. If the cutting edges 45 were straight, and the knives mounted diagonally as shown, such edge would generate a hyperboloid and not a cylinder. However, knives 40 are so constructed that the cutting edges 45 are hyperbolically curved and generate a true cylinder whereby the shear bar 46 may be perfectly straight. The method employed in manufacturing knives 40 for use in a cutterhead of the type described will now be described.

Referring to FIG. 4, each knife 40 is manufactured from a flat rectangular metal workpiece 60, which comprises alloy steel preferably including carbon, manganese, chrome, silicon and molybdenum. The dimensions of the workpiece will vary according to the size of knife to be manufactured and the particular cutterhead on which it is to be mounted. In one design a workpiece blank is used which is thirty inches long, four inches wide, and five-sixteenths of an inch thick. According to applicant's method, three rectangularly shaped openings 43 are first punched in the workpiece and spaced as shown for proper mounting of the knife on supports 39. Each opening 43 is adapted to receive one of the attachment bolts 42. The necks of the bolts are adapted to be rectangular to fit into openings 43 whereby the bolts will not turn after insertion.

After the opings 43 are punched, the longitudinal ends of workpiece 60 are cut off at a fifteen degree angle to remove the sections 62, so that the end corners of the knife will not stick out when the completed knife is diagonally mounted.

So that the cutting edge of the knife will generate a true cylinder when mounted on the cutter 32, one longitudinal edge 64 of workpiece 60 is milled or otherwise cut to form a curve 65. The metal in end sections 66 is removed. The edge 65 has a curve which is hyperbolic, the amount of curvature provided depending upon the particular amount of diagonal mounting of each knife on reel 32. For example, if each knife is to be mounted on the cutterhead at a ten degree angle relative to the axis of shaft 34, then the curve provided on the edge 65 is of such nature that the edge thereof will generate a true cylinder when the cutterhead is rotated. After the milling operation is performed to remove the sections 66 from the workpiece, the edge 65 is bevelled as shown in FIG. 5 to form a cutting edge 68. When so bevelled, workpiece 60 has a side 70 which includes the cutting edge 68 and a side 71 spaced from the cutting edge by a distance equal to the thickness of the metal and the degree of bevel at the cutting edge.

After the punching and milling operations are performed, the trimmed, flat workpiece is placed on a cylindrical forming bar or die 72 having a two inch radius, which is related to the radius of the seats 41 of holders 39. As shown in FIG. 6, the workpiece is positioned on forming bar 72 with the longitudinal axis of the workpiece diagonal to the axis of the bar. The angular displacement of the workpiece relative to bar 72 is related to the angular displacement which the knife will have on cutter 32. When the workpiece is pressed to bar 72, using cooperative die member 74 as shown in FIG. 7, the workpiece becomes bent and formed as shown in FIG. 8. The workpiece thus becomes a segment of a true cylinder, with the side 70 comprising the inside wall of such segment and the side 71 the outside wall.

Since the workpiece 60 is formed on true cylinder die 72, it becomes a segment of such cylinder. When the knife is mounted on cutter 32, it seats perfectly in holders 39 because the seats 41 have curvatures which mate with the same cylinder. When the cutter rotates, edge 68 of the knife generates a true cylinder and not a hyperboloid, even though the knife is angularly mounted; this is because of the curved edge 65. As shown best in FIG. 9, when the knife is mounted on the cutter 32, the cutting edge 68 generates a true cylinder 75. The curvature of the knife conforms to the cylindrical forming die 72, illustrated in dotted lines in FIG. 9.

Knife 40 is not in the form of a twisted helix as is conventional but is in the form of a segment of a true cylinder having a cutting edge which is curved and thereby generates a true cylinder when the knife is diagonally mounted on a cutter and the cutter rotated.

After the knife is formed and curved as shown in FIG. 8, and before it is mounted on cutter 32, cutting edge 68 is adapted to be suitably hardened by induction hardening to increase the operative life of the knife. When each knife is mounted on the cutter 32, the unit structure is as shown in FIG. 10.

The method described eliminates the necessity for complicated compound helical dies to form the knives. The method involves few steps and produces outstanding results at a cost substantially less than the cost of other methods presently in use.

Instead of forming knives according to the method steps illustrated in FIGS. 4–9, each knife can be constructed as illustrated in FIG. 11. Specifically, a knife could be formed by taking a four inch true cylinder tube 80 and cutting from it a knife workpiece 81. The knife workpiece 81 would be removed by two parallel cut lines 82 and 84 extending at a desired diagonal angle relative to the axis of the tube 80. If the edge 82 is considered to be the cutting edge, it can then be bevelled to provide cutting characteristics, as desired. While satisfactory, it has been found that this method is somewhat more costly and complicated than the prior method described, because cam indexing and other means has to be provided to achieve the desired cut lines 82 and 84. Also, after the blank has been removed, the formation of the bevel is more complicated.

While this invention has been described in connection with two embodiments thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claim.

Having thus described my invention, what I claim is:

A method of making knives for a rotary cutter wherein the knives are adapted to be mounted diagonally relative to the axis of the cutter comprising providing a die plate having a die surface which is a segment of a true cylinder, then placing a flat elongate metal workpiece on said die plate and extending diagonally relative to the axis of said cylinder, then forming said workpiece to conform to said die surface wherein the workpiece assumes an arcuate form concentric with said cylinder axis, then removing the workpiece from the die and forming along one longitudinal edge thereof a cutting edge.

References Cited in the file of this patent

UNITED STATES PATENTS

| | | |
|---|---|---|
| 1,148,597 | Lewis | Aug. 3, 1915 |
| 1,674,661 | Pleister et al. | June 26, 1928 |
| 2,521,059 | Goldberg | Sept. 5, 1950 |